(No Model.)
J. A. DRAKE.
ANTIFREEZING STOCK WATERER.
No. 574,791. Patented Jan. 5, 1897.
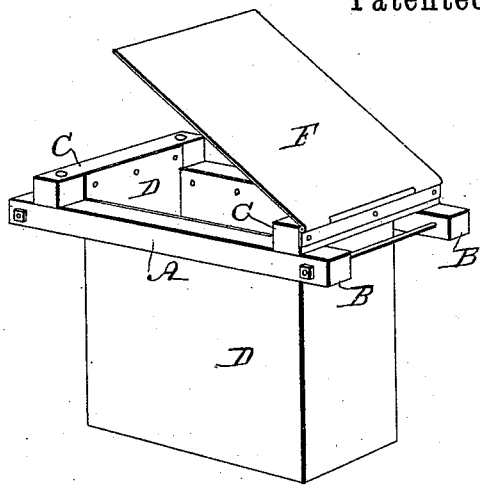
Fig. 1.
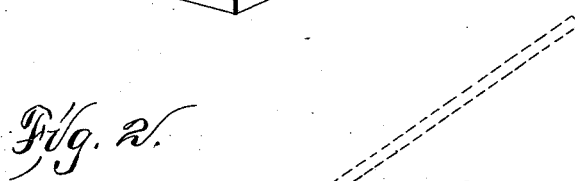
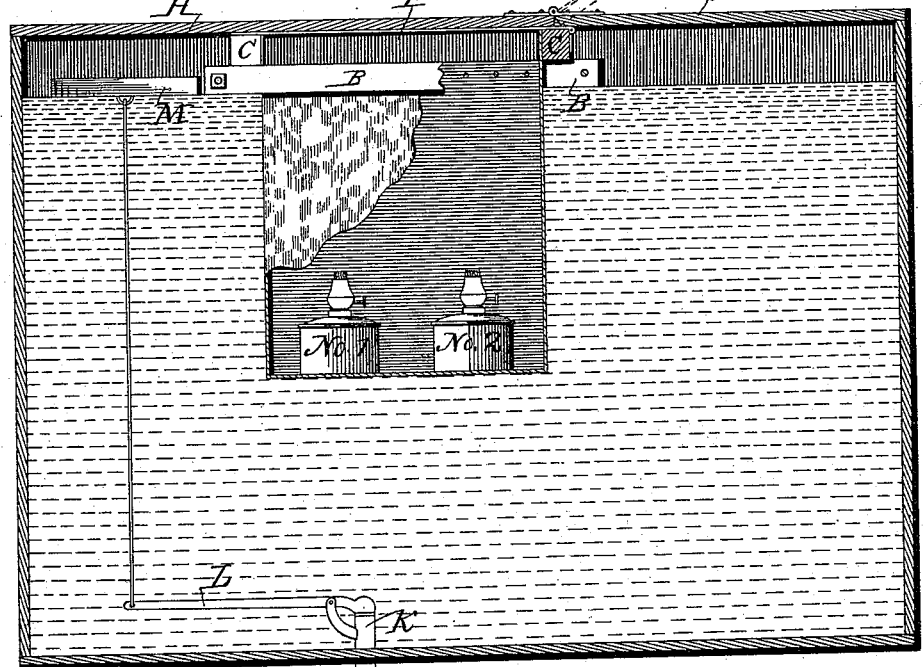
Witnesses:
W. J. Sankey.
R. H. Orwig.
Inventor: John A. Drake,
By Thomas G. and J. Ralph Orwig,
Attorneys.

UNITED STATES PATENT OFFICE.

JOHN ARTHUR DRAKE, OF BROOKLYN, IOWA.

ANTIFREEZING STOCK-WATERER.

SPECIFICATION forming part of Letters Patent No. 574,791, dated January 5, 1897.

Application filed September 4, 1896. Serial No. 604,919. (No model.)

*To all whom it may concern:*

Be it known that I, JOHN ARTHUR DRAKE, a citizen of the United States, residing at Brooklyn, in the county of Poweshiek and State of Iowa, have invented a new and useful Antifreezing Stock-Waterer, of which the following is a specification.

My object is to facilitate the placing and operating of a water-heating device in a tank or trough adapted for watering animals, as required to prevent the water from freezing in winter.

My invention consists in a water-heater adapted to float and arranged and combined with a water-tight receptacle adapted for admitting and retaining the floating heater and also adapted for removing and replacing hydrocarbon-burners in the floating heater, as required for trimming and filling the burners without removing the floating heater from the water in the receptacle, as hereinafter set forth, pointed out in my claims, and illustrated in the accompanying drawings, in which—

Figure 1 is a perspective view of the floating water-heater provided with a hinged cover. Fig. 2 is a transverse sectional view of a water-receptacle having an opening and hinged cover at one end adapted for admitting the heater and allowing animals access to water in the receptacle.

The letter A designates a rectangular frame made of two mating parallel bars B of wood and two cross-pieces C, fixed on top of the end portions.

D is a sheet-metal water-tight chamber, preferably made of galvanized iron, fixed to the inside faces of the parallel wooden bars B and the cross-pieces C, as shown in Fig. 1.
F is a cover fitted on top of the cross-pieces C, so that when the cover is closed there will be a continuous opening between the cover and the side pieces B of the frame, through which heated air can pass outward when the floating heater is in position as required for practical use and as illustrated in Fig. 2.

H represents a water-trough or tank provided with an opening at one side that extends its entire length and a cover J for the opening.

K is a water-supply pipe having a valve at its top and a lever L and float M connected therewith for automatically operating the valve as required to admit water into the tank and cut off the flow when the water rises to the desired height in the tank as required to prevent overflow and waste of water.

Numbers 1 and 2 represent hydrocarbon-burners placed in the bottom of the floating heater.

In practical use, when one or more lamps or burners are filled with oil and placed in the floating heater and the cover thereof closed, I place the heater in the tank through the long opening at its top and then turn the heater and push it under the fixed top portion of the tank, as shown in Fig. 2.

The heat generated by the burners in the heating-chamber escapes through the opening at its top and parallel sides and spreads over the surface of the water and prevents it from freezing, as required to allow animals to drink therefrom and also as required for the benefit of the health of the animals.

It is obvious that water may be thus advantageously kept warm in cold weather without giving the apparatus any attention whatever after the burners are lighted and the floating heater placed in the tank until the supply of oil is exhausted and the reservoirs of the burners must again be filled.

Having thus described the construction and operation of my invention, what I claim, and desire to secure by Letters Patent, is—

1. A water-tight heating-chamber adapted to float in a trough or tank, comprising a frame composed of two parallel wooden bars or side pieces and two cross-pieces fixed on their tops and end portions and a sheet-metal chamber fixed to the inside faces of said four bars and a cover on top of the cross-pieces as shown and described for the purposes stated.

2. A water-tight heating-chamber, adapted to float in a trough or tank, comprising a frame composed of two parallel wooden bars or side pieces and two cross-pieces fixed on their tops and end portions and a sheet-metal chamber fixed to the inside faces of said four bars and a cover on top of the cross-pieces as shown and described, in combination with a trough or tank, having an opening to admit a water-heater and to give access to animals, for distributing heat over the surface of the water in the tank and under the fixed top of the tank in the manner set forth, for the purposes stated.

JOHN ARTHUR DRAKE.

Witnesses:
W. J. SMITH,
O. H. LEONARD,
O. F. DORRANCE.